United States Patent [19]

Negishi

[11] Patent Number: 4,765,733
[45] Date of Patent: Aug. 23, 1988

[54] LIGHT PROJECTOR

[76] Inventor: Masataka Negishi, 29-19, Daito 2-chome, Urawa-shi, Saitama-ken, Japan

[21] Appl. No.: 878,960
[22] PCT Filed: Oct. 14, 1985
[86] PCT No.: PCT/JP85/00569
  § 371 Date: Jun. 10, 1986
  § 102(e) Date: Jun. 10, 1986
[87] PCT Pub. No.: WO86/02466
  PCT Pub. Date: Apr. 24, 1986

[30] Foreign Application Priority Data

Oct. 13, 1984 [JP] Japan ................................ 59-214762

[51] Int. Cl.$^4$ ........................................... G02B 17/00
[52] U.S. Cl. ......................................... 353/99; 353/78
[58] Field of Search .................. 353/98, 99, 121, 122, 353/78, 79, 77

[56] References Cited

FOREIGN PATENT DOCUMENTS 573322  3/1959  Canada ................................. 353/99
0066295 12/1982 European Pat. Off. ............ 350/505
1364060  5/1964  France ................................. 353/99

Primary Examiner—Harry N. Haroian
Attorney, Agent, or Firm—Ladas & Parry

[57] ABSTRACT

A light source (L) is disposed on an optical axis (O—O) and a first reflecting mirror ($M_1$) and a second reflecting mirror ($M_2$) are fixedly provided adjacent to the optical axis. For instance, each of these first and second reflecting mirrors is defined by a surface of revolution of a curved line generated around the optical axis (L). The first reflecting mirror ($M_1$) has such a three-dimensional configuration that a uniform distribution of the light rays reflected thereby is obtained. The second reflecting mirror ($M_2$) has such a three-dimensional configuration that the light rays reflected from the first reflecting mirror ($M_1$) is reflected by the second reflecting mirror ($M_2$) so as to converge at one point (13) on the axis (O—O). Therefore, the light rays are emitted from the one point (13) with a predetermined directivity. As a consequence, when an original (11) is placed in the path of the light rays, the image of the original (11) is clearly projected on a screen (S) regardless of the distance between the original (11) and the convergent point (13).

6 Claims, 8 Drawing Sheets

LIGHT PROJECTOR

TECHNICAL FIELD

The present invention relates to a light projector which can be used as a slide projector, an overhead projector, a motion picture projector or the like.

BACKGROUND ART

In the conventional slide projectors, motion picture projectors and the like, a lens or lenses are inserted in the path of light rays projected from a light source so that in order to sharply focus an image on a screen, the positions of an original and the lens or lenses must be adjusted. In other words, a projected image cannot be sharply focused on a screen regardless of the relative position of the original with respect to the lens or lenses. Furthermore, the lens is accompanied by a problem in that the quantity of light which passes therethrough is insufficient in the peripheral portion thereof so that the peripheral portion of the image focused on the screen becomes somewhat darker. In addition, the problems such as color dispersion, chromatic aberration, curvature of field and the like of lenses cannot be completely eliminated. Moreover, with image projectors utilizing the lenses, the position of a projector relative to a projection screen is limited.

The present invention was made in view of the above and has for its object to provide a light projector which can not only overcome the above described problems but also attain excellent features to be described below.

DISCLOSURE OF THE INVENTION

According to the present invention, a light projector comprises a point light source and light reflecting means disposed at a position to reflect light rays emitted from the point light source. The light reflecting means comprises means for controlling the distribution of the reflected light rays, and light ray shaping means for determining the direction of the reflected light rays in such a way that the reflected light rays are focused substantially at a single point.

BEST MODES FOR CARRYING OUT THE INVENTION

Figure 1:
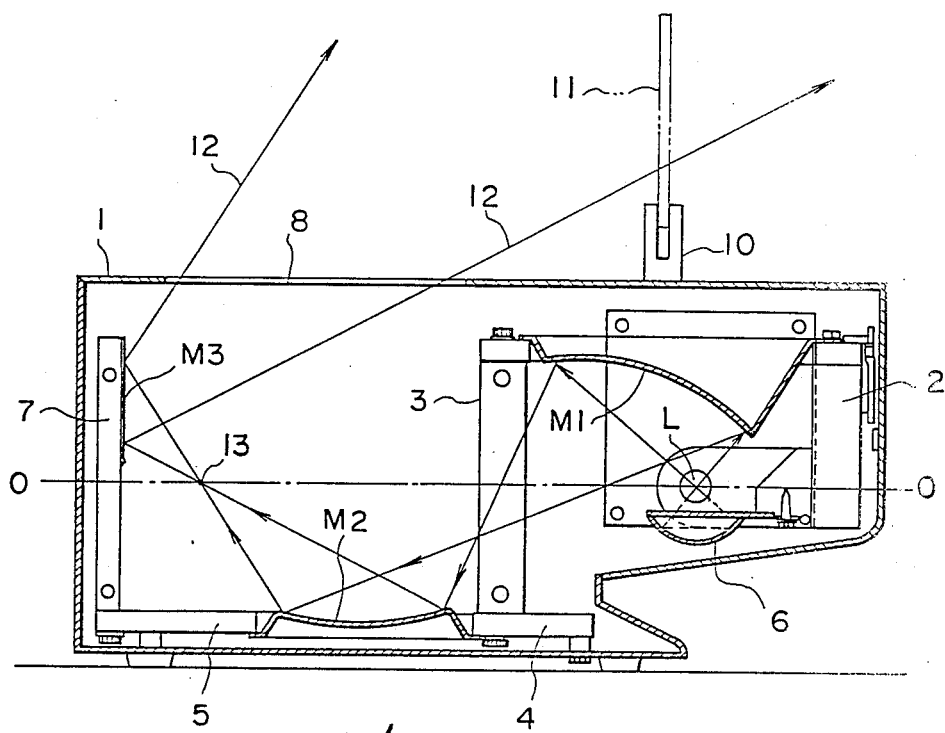
FIG. 1 is a vertical sectional view of a first preferred embodiment of a light projector in accordance with the present invention.
Figure 2:
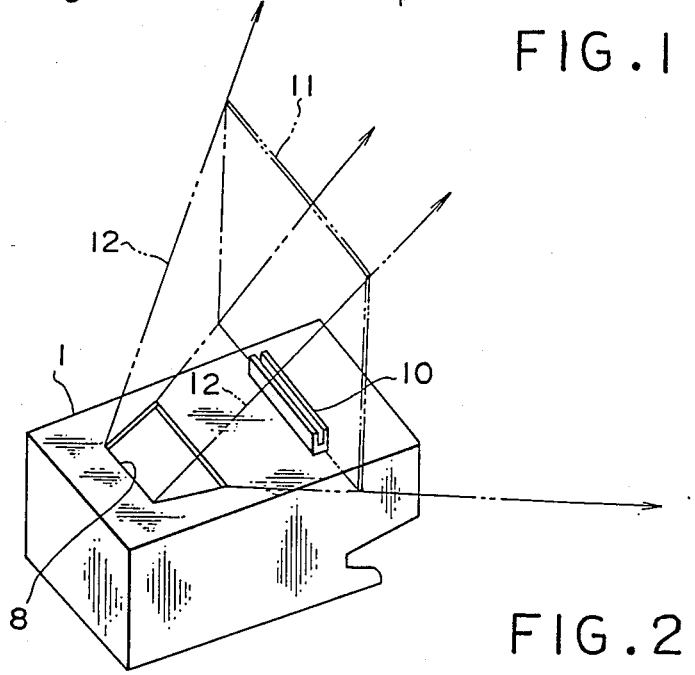
FIG. 2 is a perspective view thereof.

FIGS. 1 and 2 show a light projector to which the principle of the present invention is applied. In FIGS. 1 and 2, reference numeral 1 designates a case in which a light source L is fixedly positioned. The light source L is of such a size that it may be considered to be substantially a point light source. In this case, even when a light source has a relatively large volume, a light point at which light rays emitted from the light source are converged through a lens may be considered as a point light source. In the case of the first preferred embodiment shown in FIG. 1, the light source L is located on an imaginary axis O—O (to be referred to as "the axis" hereinafter) which extends in the horizontal direction.

Within the case 1, a first reflecting mirror $M_1$ is supported fixedly by supporting members 2 and 3 in such a way that the reflecting surface of the reflecting mirror $M_1$ is directed downwardly. The first reflecting mirror $M_1$ is disposed above the light source L. A second reflecting mirror $M_2$ which is spaced apart from the first reflecting mirror $M_1$ in the horizontal direction is disposed fixedly on the bottom wall of the case 1 and supported by supporting members 4 and 5 in such a way that the reflecting surface of the second reflecting mirror $M_2$ is directed upwardly.

A spherical or elliptical reflecting mirror 6 is disposed below the light source L, light rays are emitted from the light source L toward the first reflecting mirror $M_1$ and light rays reflected by the first reflecting mirror $M_1$ are directed toward the second reflecting mirror $M_2$. The second reflecting mirror $M_2$ reflects the light rays obliquely upwardly. The first and second reflecting mirrors $M_1$ and $M_2$ constitute light reflecting means.

A planar reflecting mirror $M_3$ is supported by a supporting member 7 in the path of the light rays reflected by the second reflecting mirror $M_2$ and an opening 8 is formed through the top wall of the case 1 in order to permit the emission of the light rays reflected by the planar reflecting mirror $M_3$ out of the case 1.

An original mounting member 10 is disposed on the top wall of the case 1 and supports an original 11 such as a transparent plate bearing an image. The reflected light rays 12 emitted through the opening 8 are transmitted through the original 11 so that the image of the original 11 is projected upon a screen (not shown) disposed at the upper right portion in FIG. 1.

It should be understood that the flat reflecting mirror $M_3$ as well as the reflecting mirror 6 are not essential component parts of the present invention so that they can be dispensed with. When the planar reflecting mirror $M_3$ is dispensed with, the light rays reflected from the second reflecting mirror $M_2$ are projected directly to the exterior and used appropriately. In this case, of course, the position at which the original 11 is installed must be changed.

When the reflecting mirror 6 is eliminated, the quantity of the effective light rays emitted from the light source will be reduced to about a half so that it is apparent that the brightness of the image projected on the screen will also be reduced almost by one half.

Next, how the first and second reflecting mirrors are constructed will be described.

Figure 3:
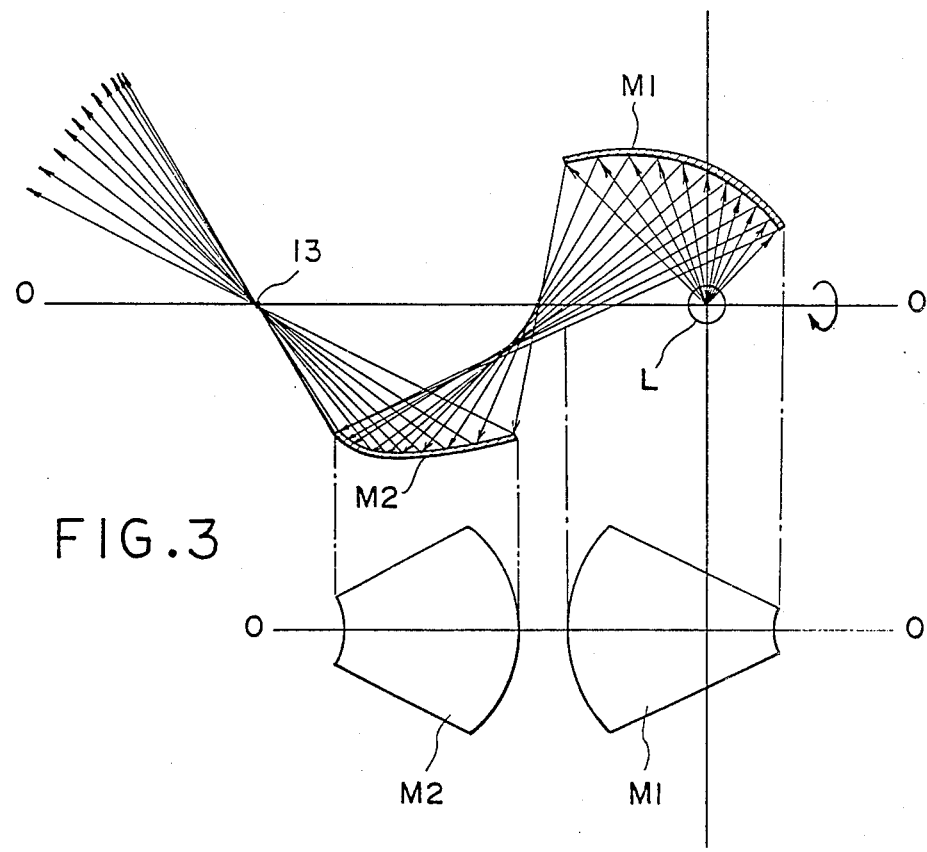
FIG. 3 is a schematic view explanatory of the optical system of the light projector as shown in FIG. 1.

As best shown in FIG. 3, the reflecting surface of the first reflecting mirror $M_1$ is defined by a part of a surface of revolution of a curved line about the axis O—O so that the cross section of the reflecting mirror $M_1$ shown in FIG. 3 is a cross section of the surface of revolution. A plan view of the first reflecting mirror $M_1$ is shown in the lower portion in FIG. 3. In like manner, the second reflecting mirror $M_2$ is defined by a part of a surface of revolution of a curved line about the axis O—O.

In the first embodiment, the first reflecting mirror $M_1$ constitutes means for controlling the distribution of the light rays reflected from the first reflecting mirror $M_1$. For instance, the reflected light rays are of uniform distribution, but it is possible to arbitrarily vary the distribution of the reflected light rays by suitably selecting the design or shape of the first reflecting mirror $M_1$.

The second reflecting mirror $M_2$ is so designed and constructed that the light rays reflected from the second reflecting mirror $M_2$ are converged at one point 13 on the axis O—O and constitutes a light ray shaping means.

The first and second reflecting mirrors $M_1$ and $M_2$ can be designed with the aid of a computer based upon the geometrical analysis.

Thus, the light rays reflected from the second reflecting mirror $M_2$ are light rays which are emitted from the point 13 with a predetermined directivity and have a uniform distribution (or any other predetermined distribution depending upon the purpose of use of the reflected light rays). These characteristics of the light rays reflected from the second reflecting mirror $M_2$ remain unchanged even when the reflected light rays are further reflected by the planar reflecting mirror $M_3$.

Figure 4:
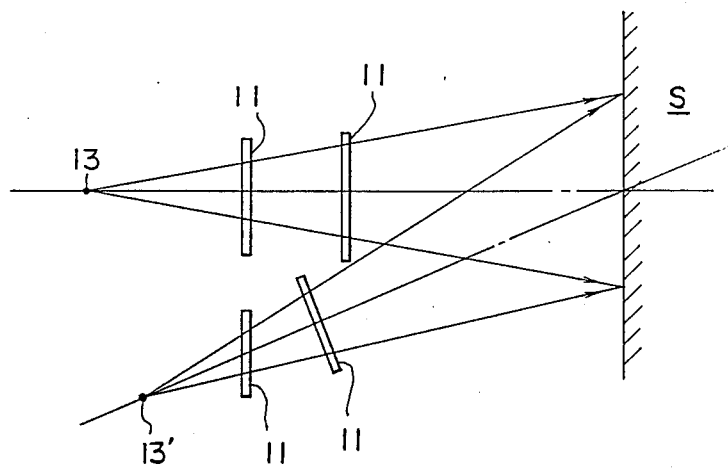
FIG. 4 is a schematic view explanatory of the effects of the present invention.

When the original 11 is placed in the path of the light rays emitted from the one point and having a predetermined directivity as shown in FIG. 4, the image of the original 11 can be clearly projected on a screen S regardless of the distance between the original 11 and the converging point 13. In addition, it is possible that the light rays are caused to impinge obliquely onto the screen S from a converging point 13' instead of causing them to impinge perpendicularly to the screen S from the converging point 13. It will be understood that regardless of the position and posture or orientation of the original 11, the image of the original 11 can be clearly projected on the screen S. When the original 11 is inclined at an angle relative to the projection screen S, the image of the original 11 as viewed from an oblique direction will be projected on the screen S.

This means that the image of the original 11 can be projected clearly on the screen regardless of the position of the original 11; the magnification of the image projected upon the screen can be varied infinitesimally depending solely upon the position of the original 11; and the position of the projector main body may be arbitrarily selected; that is, the projector main body may be spaced apart from the screen by any suitable distance and may be positioned at any suitable position in horizontal, vertical and oblique directions relative to the screen. In every case, the image of the original 11 can be projected clearly on the screen.

As described above, according to the present invention, regardless of the position of the original, the image thereof is reproduced clearly on the screen. It follows therefore that even when two or more originals are superimposed one upon another, a synthesized image thereof is projected clearly on the screen. An example of application of this effect is as follows. That is, the locus of a small body floating in the body of a liquid can be projected as a two-dimensional image on each of a plurality of projection screens at different positions when light rays emitted from a convergent point are caused to pass through the liquid. When the two-dimensional images thus obtained are synthesized, it becomes possible to completely analyze the movement of the small body in the liquid, which has been so far considered impossible. In addition, the present invention can attain the effect substantially similar to that of the Schlieren method. Therefore, the present invention can be used to detect variations in index of refraction of a transparent body, to inspect flaws or scratches thereon and to observe a pattern of light rays reflected from the surface of a piece of cloth or metal and projected on a screen, thereby checking the surface condition thereof. Furthermore, according to the present invention, no lens is used so that the inherent problems such as color dispersion, chromatic aberration, curvature of field and the like resulting from the use of lenses will not occur and that the problem that the quantity of light is insufficient in the peripheral portion of the projected image can also be overcome. Moreover, the light projector in accordance with the present invention can be so easily designed and constructed that the undesired leakage of light rays can be completely prevented. Therefore, for instance, light rays can be projected only on the area of the projection screen or the like.

The original 11 is not limited to a transparent plate or film bearing an image, but may be a liquid crystal display device capable of displaying a moving motion picture. In addition, it is possible to project an additive process type color image by projecting simultaneously a plurality of lights of additive primary colors such as red, green, blue and the like from respective light projectors and through respective originals.

FIGS. 5 through 14 show various modifications of the light projector in accordance with the present invention.

Figure 5:
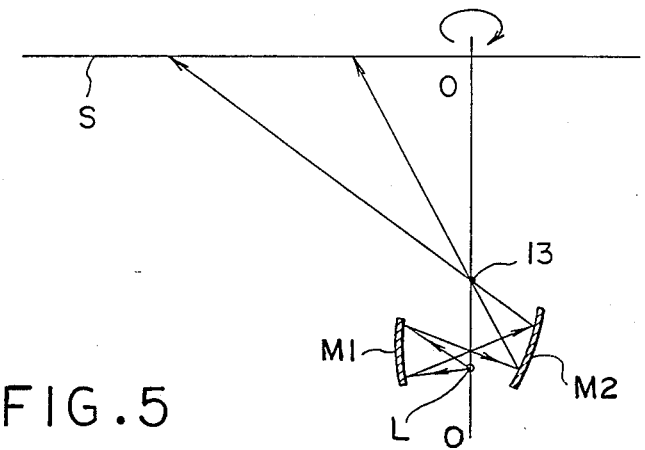
FIGS. 5 through 14 are schematic views showing, respectively, the optical principles of various modifications of the first embodiment shown in FIG. 1.

The underlying principle of the modification as shown in FIG. 5 is substantially similar to that of the first embodiment best shown in FIG. 3. The light rays emitted from the light source L impinge on the first reflecting mirror $M_1$. The light rays reflected by the first reflecting mirror $M_1$ intersect each other and impinge on the second reflecting mirror $M_2$ and the light rays reflected by the second reflecting mirror $M_2$ converge at one point 13 on the axis O—O and are projected on the screen S. In this modification, the first and second reflecting mirrors $M_1$ and $M_2$ are disposed on the opposite sides of the axis O—O and are substantially in opposed relationship with each other.

Figure 6:
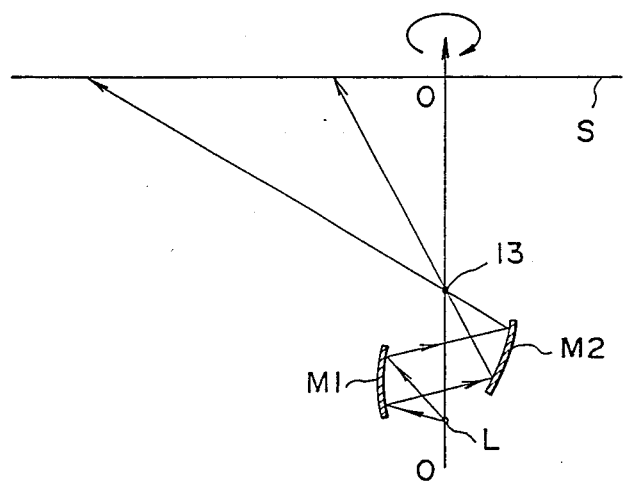

In the modification as shown in FIG. 6, the light rays reflected by the first reflecting mirror $M_1$ toward the second reflecting mirror $M_2$ do not intersect each other. In the two modifications as shown in FIGS. 5 and 6, the light rays emitted from the light source L can be most effectively utilized because of a solid angle.

Figure 7:
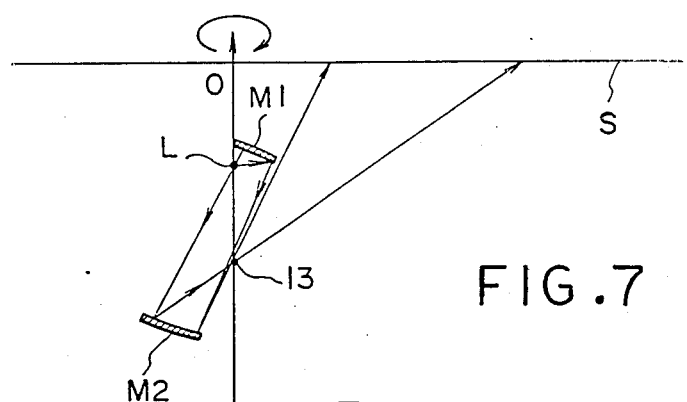
Figure 8:
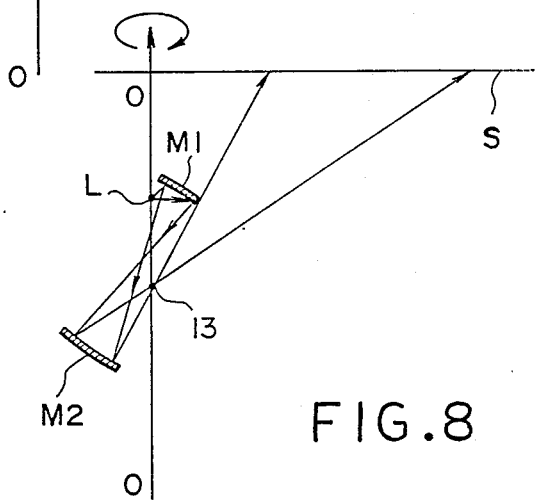

In the cases of the modifications as shown in FIGS. 7 and 8, the first and second reflecting mirrors $M_1$ and $M_2$ are spaced apart from each other in the direction of the axis O—O. In the case of the modification as shown in FIG. 7, the light rays reflected from the first reflecting mirror $M_1$ toward the second reflecting mirror $M_2$ intersect each other while in the case of the modification as shown in FIG. 8, they do not intersect.

Figure 9:
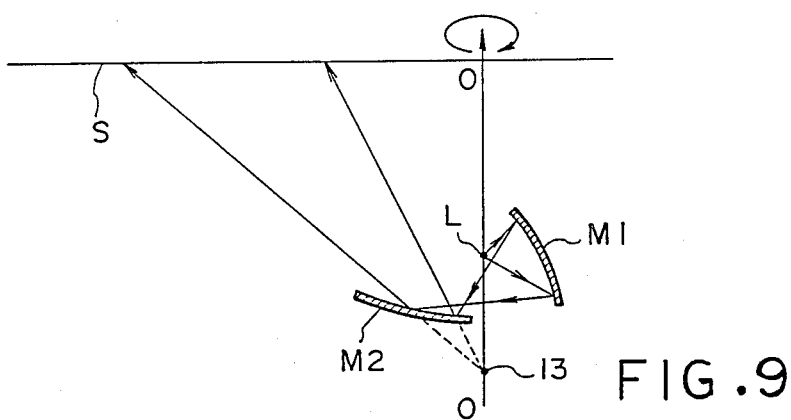
Figure 10:
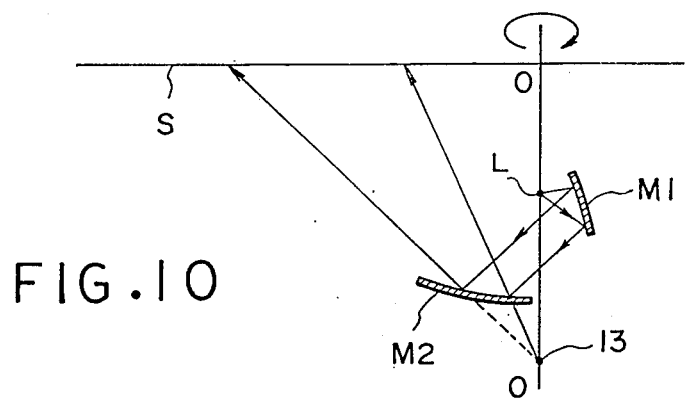

In the case of the modification as shown in FIG. 9, the light rays reflected by the second reflecting mirror $M_2$ are not converged in a real space, but are converged at an imaginary point 13 on the axis O—O. In the case of the modification as shown in FIG. 10, the light rays reflected by the first reflecting mirror $M_1$ toward the second reflecting mirror $M_2$ do not intersect although they intersect in the modification as shown in FIG. 9.

In the above-described modifications, the first and second reflecting mirrors $M_1$ and $M_2$ are disposed on the opposite sides of the axis O—O, but in the modifications as shown in FIGS. 11 through 14, they are disposed on the same side of the axis O—O.

Figure 11:
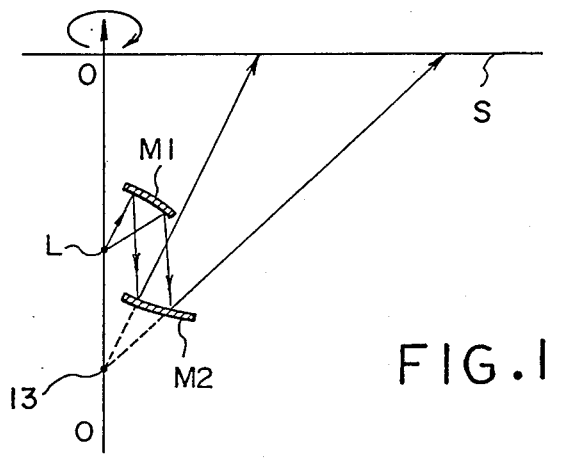
Figure 12:
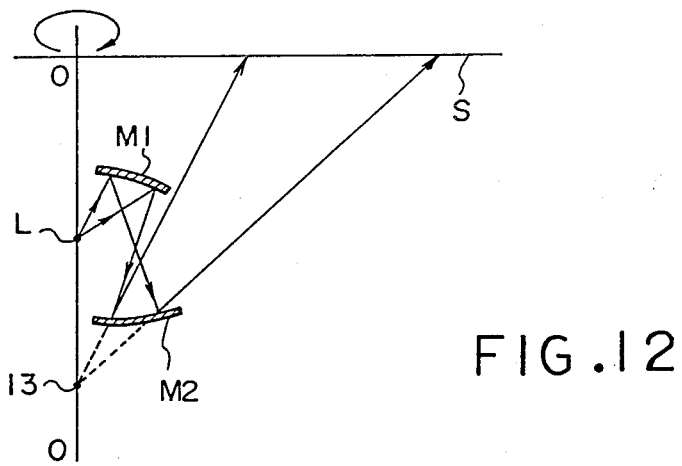

In the case of the modification as shown in FIG. 11, the light rays reflected from the first reflecting mirror $M_1$ toward the second reflecting mirror $M_2$ do not intersect, but in the case of the modification as shown in FIG. 12, they do intersect. In these modifications, the light rays are converged at an imaginary point 13.

Figure 13:
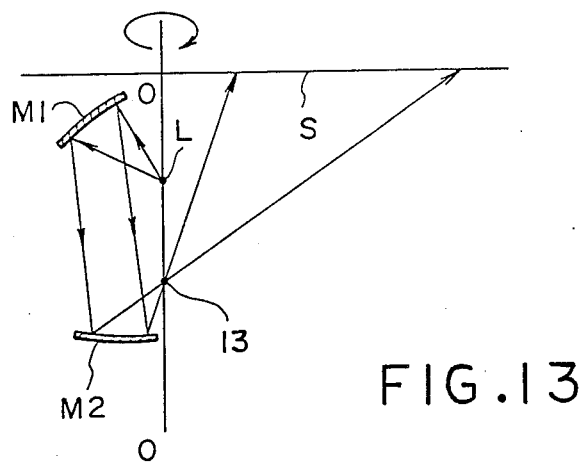
Figure 14:
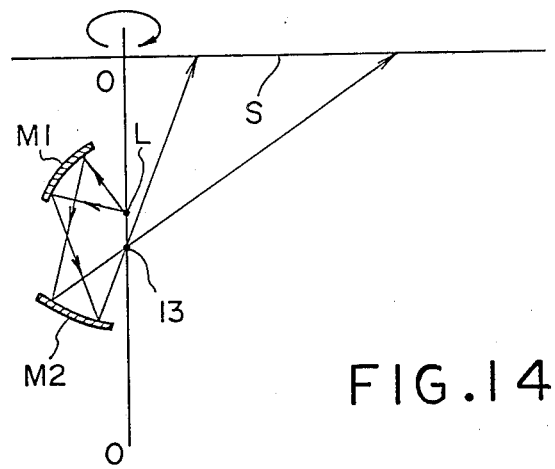

In the case of the modification as shown in FIG. 13, the light rays reflected by the first reflecting mirror $M_1$ toward the second reflecting mirror $M_2$ do not intersect, but in the case of the modification as shown in FIG. 14, they do intersect.

In the modifications described above, it is not absolutely necessary that the light rays converge strictly at the point 13. It is possible in practice to obtain a clear projected image with small distortions on the screen even when the light rays substantially converge at a point or an area adjacent to the point 13 on the axis O—O. In the above-described modifications, the first reflecting mirror $M_1$ constitutes light ray distribution control means while the second reflecting mirror $M_2$, light ray shaping means. However, it is possible to design the mirrors in such a way that both the first and second reflecting mirrors $M_1$ and $M_2$ share a dual function of light ray distribution control means and light ray shaping means.

In addition, instead of the first and second reflecting mirrors $M_1$ and $M_2$, only one reflecting mirror having a dual function of light ray distribution control means and light ray shaping means may be used in a light projector which needs no strict requirements.

Furthermore, it is not needed to define the first and second reflecting mirrors $M_1$ and $M_2$ as parts, respectively, of surfaces of revolution so long as they can accomplish the above-described functions.

Moreover, so far the projection screen S has been described as being of the reflective type in which the image is projected on the surface thereof directed toward the light projector, but it is to be understood that the projection screen S may be of light transmissive type in which the image can be viewed on the surface opposite to the light projector.

Figure 15:
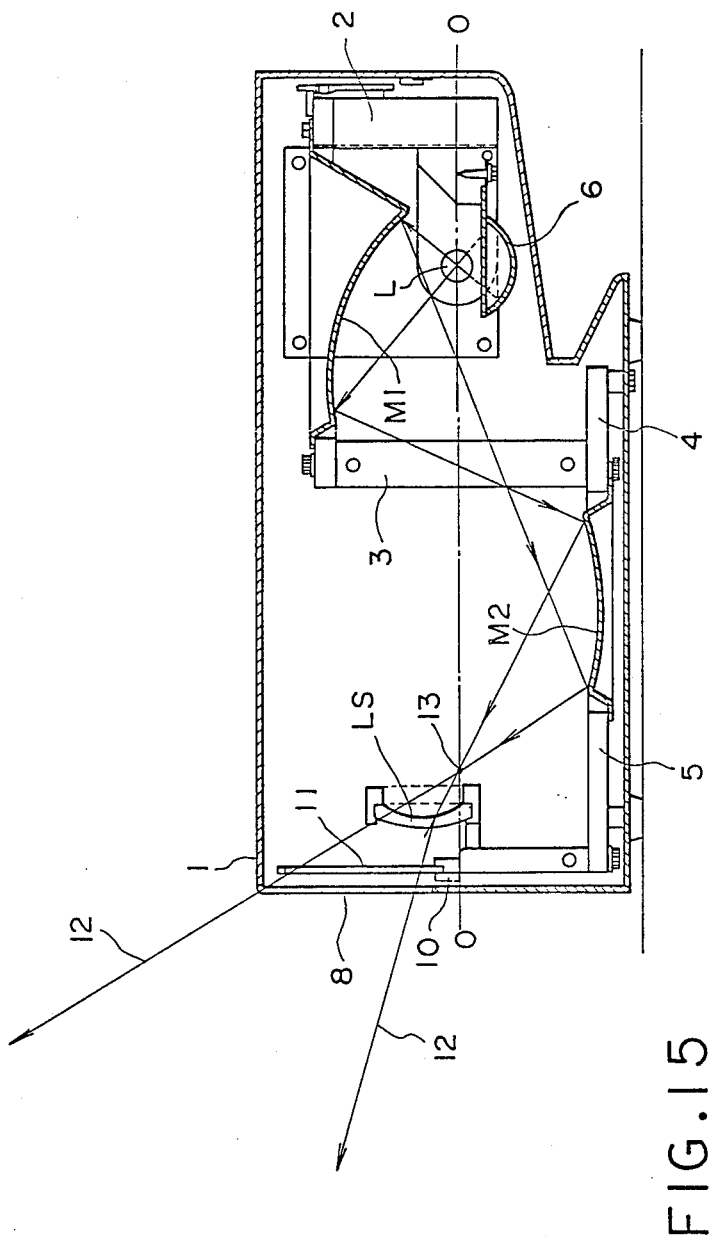
FIG. 15 is a vertical sectional view of a second preferred embodiment of the present invention in which a lens is inserted in an optical system.

A second preferred embodiment as shown in FIG. 15 is similar in construction to the first preferred embodiment described above with reference to FIG. 1 except that a lens LS is inserted in the optical path. It should be noted here that in the case of the second preferred embodiment as shown in FIG. 15, the first and second reflecting mirrors $M_1$ and $M_2$ are so arranged that the light rays are converged at one point 13 on the axis O—O and that the lens LS is provided only for the purpose of enlarging or reducing the size of the image to be formed upon the screen S by the light rays emitted from the one point 13 with a predetermined directivity. In the second embodiment, an original mounting member 10 for holding the original 11 is disposed at the position at which is located the planar reflecting mirror M3 in the first embodiment. When the lens LS is inserted into the optical system as described above, the projected image can be improved by utilizing the optical characteristics of the lens LS.

Figure 16:
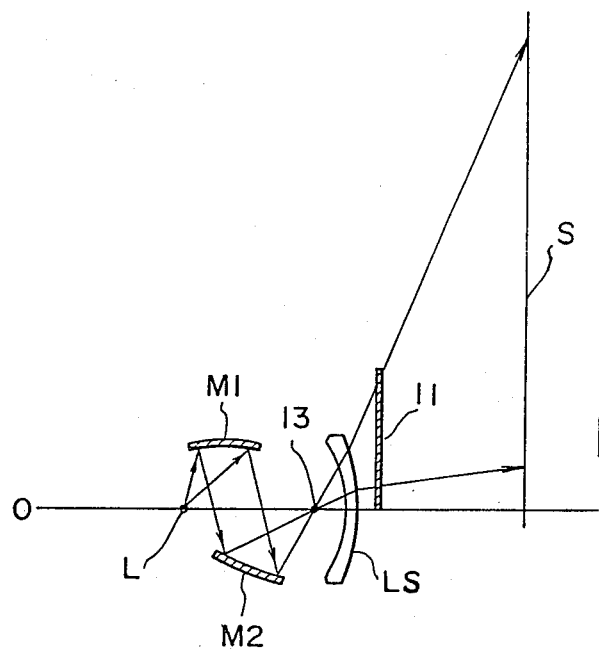
FIGS. 16 and 17 are views showing the optical principles of modifications, respectively, of the second embodiment shown in FIG. 15 in which a lens is inserted into an optical system.
Figure 17:
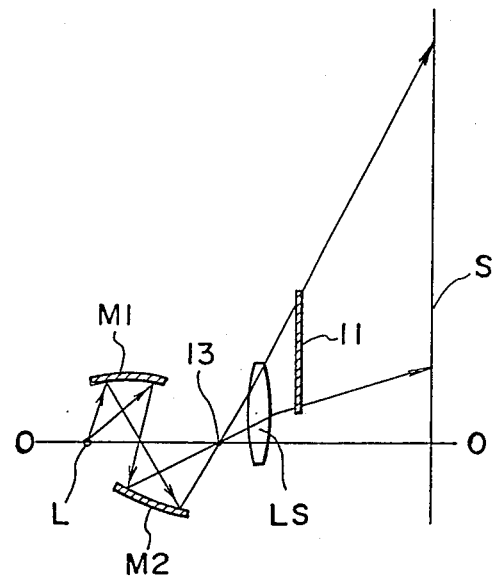

FIG. 16 shows the underlying principle of a first modification of the second embodiment as shown in FIG. 15 and is different from the second embodiment in that the light rays reflected by the first reflecting mirror $M_1$ toward the second reflecting mirror $M_2$ do not intersect. A second modification as shown in FIG. 17 is substantially similar in construction to the second embodiment shown in FIG. 15 except that the lens LS used in the second modification is different from the lens LS used in the second embodiment.

So far it has been described that only one lens LS is used in the second embodiment and its modifications, but it is to be understood that a lens system consisting of a plurality of lens elements having a function of an achromatic lens and capable of aberration compensations can of course be used.

As described above, according to the present invention, regardless of the position of the original, its image can be sharply and clearly projected on the screen. The magnification of the projected image can be varied freely and a synthesized image of superimposed originals can also be projected on the screen. In addition, a three-dimensional object can be projected on a screen as a two-dimensional image. The present invention can overcome the defects of the optical system utilizing the lenses and can provide a light projector capable of projecting a motion picture or a color picture.

INDUSTRIAL APPLICABILITY

The light projector in accordance with the present invention can be used as a slide projector, an overhead projector, a motion picture projector or an image forming device.

I claim:

1. A light projector comprising:
   a point light source disposed on an imaginary axis;
   a light reflecting means for reflecting light rays emitted from said point light source, said light reflecting means comprising first mirror means defined by part of a surface of revolution of a curved line generated about said imaginary axis and reflecting light rays in directions having components in the direction of said imaginary axis thereby producing a uniform distribution of the rays throughout the cross section of the reflected light rays;
   light ray shaping mirror means for determining directions of all of the light rays reflected thereby to cause them to converge substantially at one point on said imaginary axis and then diverge from said point with a uniform distribution thereof; and
   means for mounting an original having an image to be projected at a position such that said light rays diverging from said point pass through said original.

2. A light projector as defined in claim 1 wherein said light ray shaping mirror means comprises a second reflecting mirror defined by a surface of revolution generated about said imaginary axis.

3. A light projector as defined in claim 2 wherein said first and second reflecting mirrors have a dual function of said light ray reflecting means and said light ray shaping means.

4. A light projector as defined in claim 1 wherein said light ray shaping means is so formed that the light rays reflected thereby may converge at an imaginary point behind the light ray shaping means relative to the direction in which the light rays are reflected.

5. A light projector as defined in claim 1 wherein said light ray shaping means is so formed that the light rays reflected thereby may converge after the light rays have been reflected.

6. A light projector according to claim 1, further comprising lens means inserted downstream of said one point relative to the direction in which the light rays diverge and upstream of said means for mounting the original.

* * * * *